United States Patent
Tiwari

(10) Patent No.: US 10,021,624 B2
(45) Date of Patent: Jul. 10, 2018

(54) DEVICE AND METHOD OF HANDLING NETWORK FEATURE

(71) Applicant: HTC Corporation, Taoyuan (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/590,029

(22) Filed: May 9, 2017

(65) Prior Publication Data
US 2017/0332308 A1 Nov. 16, 2017

Related U.S. Application Data

(60) Provisional application No. 62/333,872, filed on May 10, 2016.

(51) Int. Cl.
| | |
|---|---|
| *H04W 48/08* | (2009.01) |
| *H04W 76/10* | (2018.01) |
| *H04L 29/08* | (2006.01) |
| *H04W 8/02* | (2009.01) |
| *H04W 8/18* | (2009.01) |
| *H04W 28/12* | (2009.01) |

(Continued)

(52) U.S. Cl.
CPC ............. *H04W 48/08* (2013.01); *H04L 67/04* (2013.01); *H04L 67/303* (2013.01); *H04W 8/02* (2013.01); *H04W 8/183* (2013.01); *H04W 28/12* (2013.01); *H04W 40/242* (2013.01); *H04W 48/10* (2013.01); *H04W 60/04* (2013.01); *H04W 76/10* (2018.02)

(58) Field of Classification Search
CPC ......... H04L 36/32; H04L 67/04; H04L 29/08; H04L 67/303; H04W 60/04; H04W 8/18; H04W 48/08; H04W 40/24; H04W 40/242; H04W 28/12; H04W 8/02; H04W 48/10; H04W 8/183; H04W 76/10
USPC ........................................................ 455/434
See application file for complete search history.

(56) References Cited

U.S. PATENT DOCUMENTS 9,661,546 B2 * 5/2017 Johansson ............. H04W 36/30
9,867,084 B2 * 1/2018 Kweon .................. H04W 76/15

(Continued)

OTHER PUBLICATIONS

Search Report dated Sep. 27, 2017 for EP application No. 17170295.4, pp. 1-7.

(Continued)

*Primary Examiner* — Khawar Iqbal
(74) *Attorney, Agent, or Firm* — Winston Hsu

(57) ABSTRACT

A communication device of handling a network feature comprises a storage unit for storing instructions and a processing circuit coupled to the storage unit. The processing circuit is configured to execute the instructions stored in the storage unit. The instructions comprise receiving system information indicating whether an Evolved Packet System (EPS) optimization is supported and a first Non Access Stratum (NAS) message indicating whether the EPS optimization is supported; determining to use the EPS optimization, when the system information indicates that the EPS optimization is not supported and the first NAS message indicates that the EPS optimization is supported; and determining not to use the EPS optimization, when the system information indicates that the EPS optimization is supported and the first NAS message indicates that the EPS optimization is not supported.

15 Claims, 5 Drawing Sheets

(51) Int. Cl.
  *H04W 40/24* (2009.01)
  *H04W 60/04* (2009.01)
  *H04W 48/10* (2009.01)

(56) References Cited

U.S. PATENT DOCUMENTS

| | | | | |
|---|---|---|---|---|
| 9,900,911 | B2* | 2/2018 | Nuggehalli | H04W 74/08 |
| 2015/0029949 | A1* | 1/2015 | Tsai | H04W 48/18 |
| | | | | 370/329 |
| 2015/0215845 | A1* | 7/2015 | Pinheiro | H04W 48/06 |
| | | | | 455/418 |
| 2016/0037473 | A1 | 2/2016 | Cho | |
| 2016/0262058 | A1* | 9/2016 | Jeong | H04W 4/025 |
| 2016/0337898 | A1* | 11/2016 | Jeong | H04W 28/0289 |
| 2017/0064487 | A1* | 3/2017 | Buckley | H04W 4/70 |
| 2017/0188275 | A1* | 6/2017 | Kim | H04W 36/023 |
| 2017/0290084 | A1* | 10/2017 | Wu | H04W 76/10 |
| 2017/0318606 | A1* | 11/2017 | Lee | H04W 74/004 |
| 2018/0007614 | A1* | 1/2018 | Velev | H04W 48/06 |
| 2018/0092016 | A1* | 3/2018 | Kim | H04W 36/32 |

OTHER PUBLICATIONS

Qualcomm Incorporated, "Core Network node selection for CIOT", SA WG2 Meeting #113AH, S2-161062, Feb. 23-26, 2016, Sophia Antipolis, France, XP051078049, pp. 1-4.

Nokia, "RRC layer impacts and System information usage in attach procedure", 3GPP TSG SA WG2 Meeting #114, S2-161906, Apr. 11-15, 2016, Sophia Antipolis, France, XP051092134, pp. 1-15.

Qualcomm Incorporated, "New cause for attach reject by Rel.13 MME", 3GPP TSG-CT WG1 Meeting #97, C1-162154, Apr. 11-15, 2016, Ljubljana(Slovenia), XP051098010, pp. 1-7.

HTC, "Handling of support indication for a CIoT feature sent in system info and NAS message", SA WG2 Meeting #115, S2-162442, May 23-27, 2016, Nanjing, China, XP051109202, pp. 1-2.

3GPP TS 23.401 V13.6.1, Mar. 2016.

3GPP TSG SA WG2 Meeting #114 S2-162051, Apr. 2016.

* cited by examiner

DEVICE AND METHOD OF HANDLING NETWORK FEATURE

CROSS REFERENCE TO RELATED APPLICATIONS

This application claims the benefit of U.S. Provisional Application No. 62/333,872, filed on May 10, 2016, which is incorporated herein by reference.

BACKGROUND OF THE INVENTION

1. Field of the Invention

The present invention relates to a communication device and a method used in a wireless communication system, and more particularly, to a communication device and method of handling a network feature.

2. Description of the Prior Art

A user equipment (UE) may initiate an attach procedure or a tracking area updating procedure, after determining whether a network feature is supported according to system information indicating whether the network feature is supported received from a network. Then, the network may transmit a Non Access Stratum (NAS) message indicating whether the network feature is supported to the UE. However, the UE may not be able to determine whether the network feature is supported, when information of a support of the network feature provided in the system information and information of a support of the network feature provided in the NAS message are mismatched.

Thus, how to handle the network feature is an important problem to be solved.

SUMMARY OF THE INVENTION

The present invention therefore provides a method and related communication device for handling a network feature to solve the abovementioned problem.

A communication device of handling a network feature comprises a storage unit for storing instructions and a processing circuit coupled to the storage unit. The processing circuit is configured to execute the instructions stored in the storage unit. The instructions comprise receiving system information indicating whether an Evolved Packet System (EPS) optimization is supported and a first Non Access Stratum (NAS) message indicating whether the EPS optimization is supported; determining to use the EPS optimization, when the system information indicates that the EPS optimization is not supported and the first NAS message indicates that the EPS optimization is supported; and determining not to use the EPS optimization, when the system information indicates that the EPS optimization is supported and the first NAS message indicates that the EPS optimization is not supported.

A communication device of handling a network feature comprises a storage unit for storing instructions and a processing circuit coupled to the storage unit. The processing circuit is configured to execute the instructions stored in the storage unit. The instructions comprise receiving system information indicating whether an Evolved Packet System (EPS) optimization is supported and a first Non Access Stratum (NAS) message indicating whether the EPS optimization is supported; determining to use the EPS optimization, when the system information indicates that the EPS optimization is supported and the first NAS message indicates that the EPS optimization is not supported; and determining not to use the EPS optimization, when the system information indicates that the EPS optimization is not supported and the first NAS message indicates that the EPS optimization is supported.

A communication device of handling a network feature comprises a storage unit for storing instructions and a processing circuit coupled to the storage unit. The processing circuit is configured to execute the instructions stored in the storage unit. The instructions comprise receiving system information indicating whether an Evolved Packet System (EPS) optimization is supported and a first Non Access Stratum (NAS) message indicating whether the EPS optimization is supported; determining to use the EPS optimization, when the system information indicates that the EPS optimization is supported and the first NAS message indicates that the EPS optimization is supported or not supported; and determining not to use the EPS optimization, when the system information changes from indicating the EPS optimization is supported to indicating the EPS optimization is not supported and the first NAS message indicates that the EPS optimization is supported or not supported.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
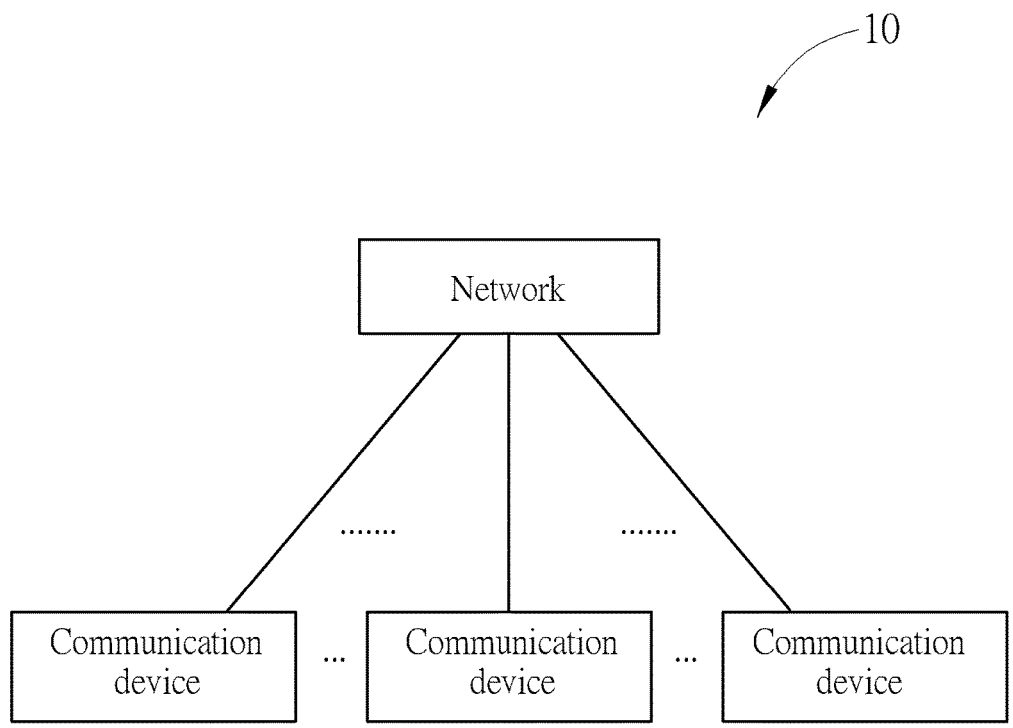
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be a universal terrestrial radio access network (UTRAN) including at least one Node-Bs (NB) in a universal mobile telecommunications system (UMTS). Alternatively, the network may be an evolved UTRAN (E-UTRAN) including at least one evolved NB (eNB) and/or at least one relay in a long term evolution (LTE) system, a LTE-Advanced (LTE-A) system , an evolution of the LTE-A system, or a fifth generation (5G) system. Further, the network may also include both the UTRAN/E-UTRAN and a core network, wherein the core network includes network entities such as a mobility management entity (MME), a serving gateway (S-GW), a packet data network (PDN) gateway (P-GW), a self-organizing networks (SON) server and/or a radio network controller (RNC), etc.

The communication device maybe a user equipment (UE) , a mobile phone, a laptop, a tablet computer, an electronic book, a portable computer system, a vehicle or an aircraft. In addition, the network and the communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
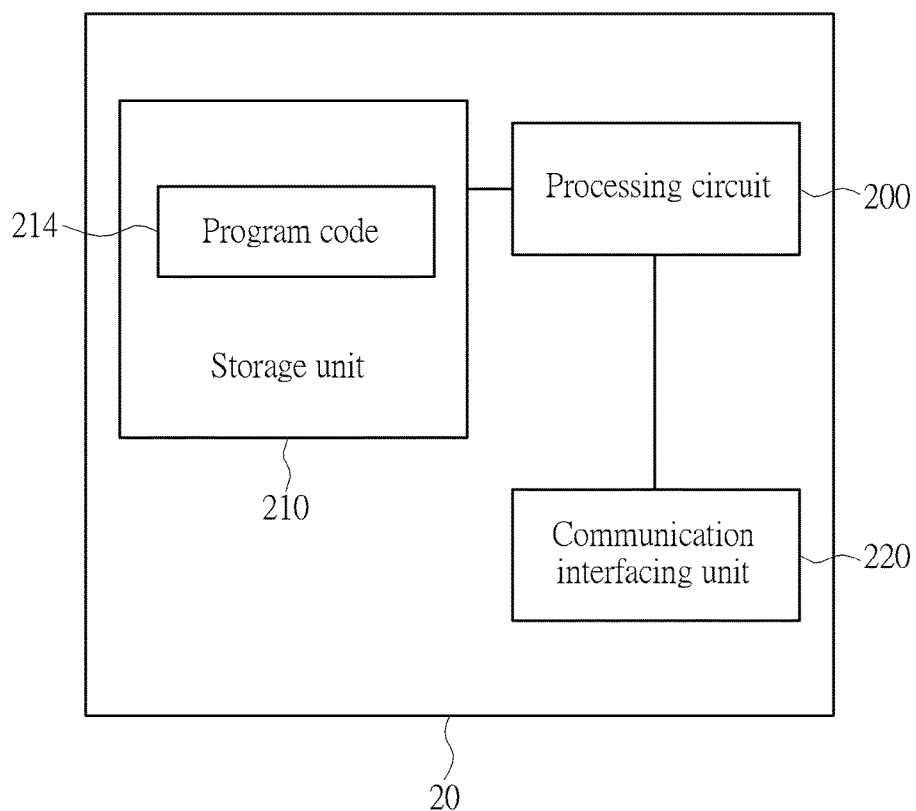
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that stores a program code 214, accessed and executed by the processing circuit 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver used to transmit and receive signals (e.g., data, signals, messages and/or packets) according to processing results of the processing circuit 200.

In the following diagrams and embodiments, a UE is used to represent the communication device in FIG. 1, to simplify the illustration of the embodiments.

Figure 3:
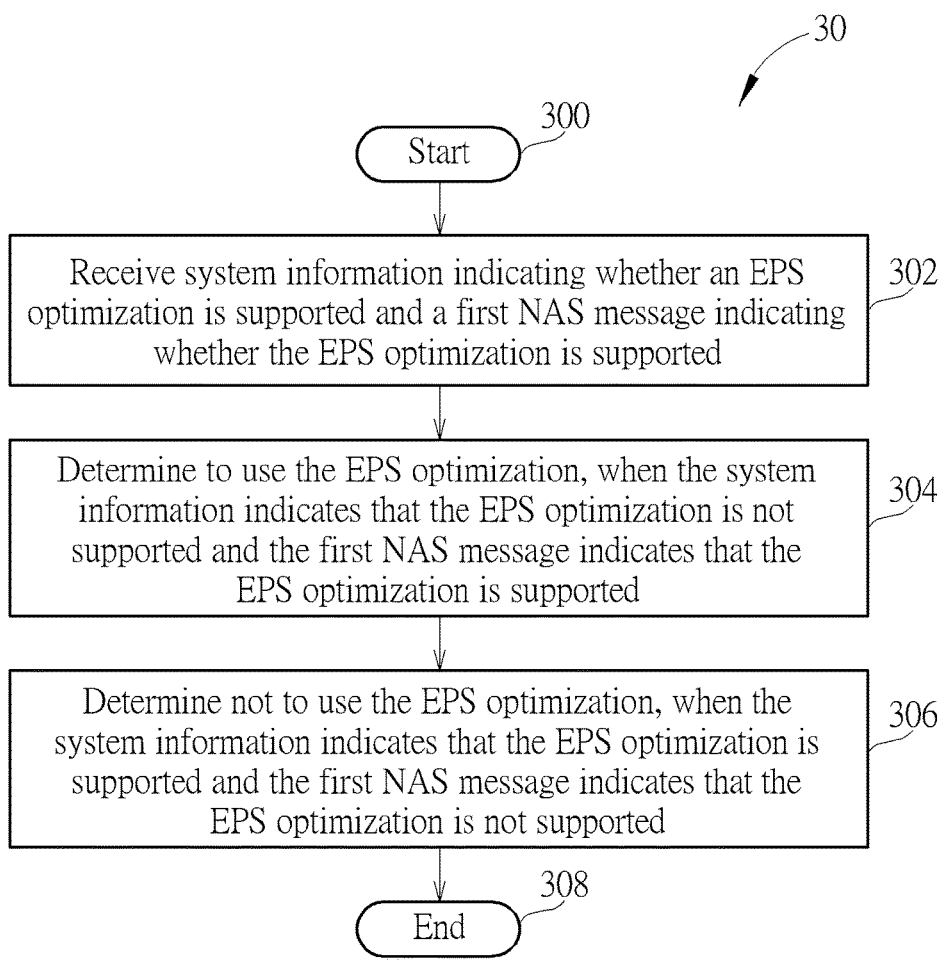
FIG. 3 is a flowchart of a process according to an example of the present invention.

FIG. 3 is a flowchart of a process 30 according to an example of the present invention. The process 30 maybe utilized in a UE (e.g., the communication device in FIG. 1), to handle a network feature in a wireless communication system. The process 30 includes the following steps:

Step 300: Start.
Step 302: Receive system information indicating whether an Evolved Packet System (EPS) optimization is supported and a first Non Access Stratum (NAS) message indicating whether the EPS optimization is supported.
Step 304: Determine to use the EPS optimization, when the system information indicates that the EPS optimization is not supported and the first NAS message indicates that the EPS optimization is supported.
Step 306: Determine not to use the EPS optimization, when the system information indicates that the EPS optimization is supported and the first NAS message indicates that the EPS optimization is not supported.
Step 308: End.

According to the process 30, the UE may receive system information (e.g., broadcasted by a network, e.g., the network in FIG. 1) indicating whether an EPS optimization is supported and a first NAS message indicating whether the EPS optimization is supported. Then, the UE may determine to use the EPS optimization, when the system information indicates that the EPS optimization is not supported and the first NAS message indicates that the EPS optimization is supported. Further, the UE may determine not to use the EPS optimization, when the system information indicates that the EPS optimization is supported and the first NAS message indicates that the EPS optimization is not supported. That is, the UE determines whether the EPS optimization is supported by the network according to (e.g., by using) the NAS message, when information of a support of the EPS optimization provided in the system information and information of a support of the EPS optimization provided in the NAS message are mismatched. In other words, a priority of the NAS message is higher than a priority of the system information. Thus, the UE is able to determine how to use the EPS optimization properly.

It should be noted that, the UE may not attempt to use (e.g., request or use) the EPS optimization which is not indicated as supported in the NAS message according to the process 30.

Realization of the process 30 is not limited to the above description. The following examples may be applied for realizing the process 30.

In one example, the EPS optimization may include a Control Plane Cellular Internet of Thing (CIoT) EPS optimization, a User Plane CIoT EPS optimization, an attach without PDN connectivity, or a Short Message Service (SMS) transfer without combined attach (e.g., which is requested).

In one example, the first NAS message may include an "ATTACH ACCEPT" message, an "ATTACH REJECT" message, a "TRACKING AREA UPDATING ACCEPT" message or a "TRACKING AREA UPDATING REJECT" message.

In one example, a first cell where the UE receives the system information and a second cell where the UE receives the first NAS message may be different. That is, the UE may move across different cells (e.g., from the first cell to the second cell) in the same tracking area (TA), and may receive the system information and the NAS message in different cells.

In one example, the UE may determine to use the EPS optimization by transmitting a second NAS message (e.g., NAS protocol data unit (PDU)) or an access stratum (AS) message related to the EPS optimization, e.g., to the network. In one example, the UE may determine not to use the EPS optimization by not transmitting a second NAS message (e.g., NAS PDU) or an AS message related to the EPS optimization, e.g., to the network.

An example is used for illustrating the process 30 as follows. A UE supporting a Control Plane CIoT EPS optimization may receive system information, and may determine whether a network supports the Control Plane CIoT EPS optimization according to the system information. Then, the UE may transmit an "ATTACH REQUEST" message including information (e.g., an information element) indicating that the UE will use the Control plane CIoT EPS optimization to the network, when the system information indicates that the network supports the Control Plane CIoT EPS optimization. The UE may receive an "ATTACH ACCEPT" message including information indicating that the network does not support the Control Plane CIoT EPS optimization. Accordingly, the UE may not transmit user data encapsulated in a NAS message (e.g., NAS PDU) to the network.

Another example is used for illustrating the process 30 as follows. A UE attached to a network to use a Control Plane CIoT EPS optimization may select a cell belonging to a TA, and may receive system information indicating that the network supports the Control Plane CIoT EPS optimization. Then, the UE may transmit a "TRACKING AREA UPDATE REQAUEST" message to the network for requesting to use the Control Plane CIoT EPS optimization. In response to the transmission of the "TRACKING AREA UPDATE REQAUEST" message, the UE may receive a "TRACKING AREA UDATING ACCEPT" message including information (e.g., an information element) indicating that the network does not support the Control Plane CIoT EPS optimization. Accordingly, the UE may not transmit user data encapsulated in the NAS message (e.g., NAS PDU) to the network.

Figure 4:
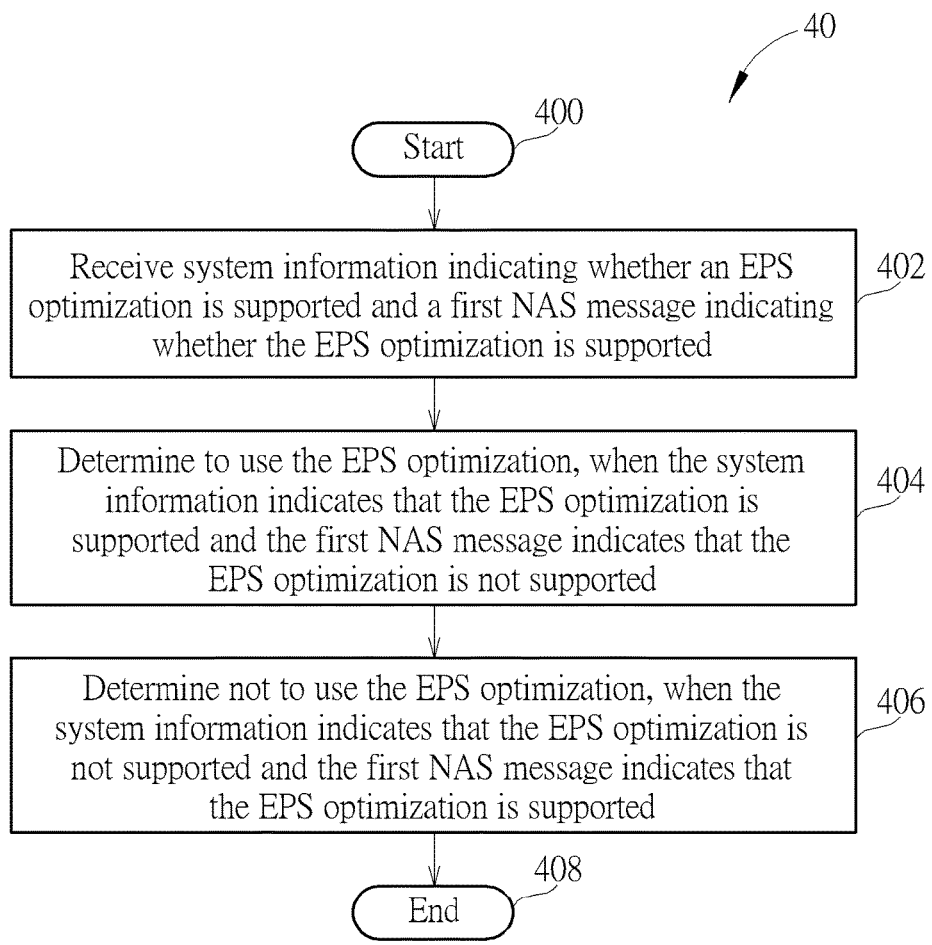
FIG. 4 is a flowchart of a process according to an example of the present invention.

FIG. 4 is a flowchart of a process 40 according to an example of the present invention. The process 40 maybe utilized in a UE (e.g., the communication device in FIG. 1), to handle a network feature in a wireless communication system. The process 40 includes the following steps:

Step 400: Start.

Step 402: Receive system information indicating whether an EPS optimization is supported and a first NAS message indicating whether the EPS optimization is supported.

Step 404: Determine to use the EPS optimization, when the system information indicates that the EPS optimization is supported and the first NAS message indicates that the EPS optimization is not supported.

Step 406: Determine not to use the EPS optimization, when the system information indicates that the EPS optimization is not supported and the first NAS message indicates that the EPS optimization is supported.

Step 408: End.

According to the process 40, the UE may receive system information (e.g., broadcasted by a network, e.g., the network in FIG. 1) indicating whether an EPS optimization is supported and a first NAS message indicating whether the EPS optimization is supported. Then, the UE may determine to use the EPS optimization, when the system information indicates that the EPS optimization is supported and the first NAS message indicates that the EPS optimization is not supported. Further, the UE may determine not to use the EPS optimization, when the system information indicates that the EPS optimization is not supported and the first NAS message indicates that the EPS optimization is supported. That is, the UE determines whether the EPS optimization is supported by the network according to (e.g., by using) the system information, when information of a support of the EPS optimization provided in the system information and information of a support of the EPS optimization provided in the NAS message are mismatched. In other words, a priority of the system information is higher than a priority of the NAS message. Thus, the UE is able to determine how to use the EPS optimization properly.

It should be noted that, the UE may not attempt to use (e.g., request or use) the EPS optimization which is not indicated as supported in the system information according to the process 40.

Realization of the process 40 is not limited to the above description. The following examples may be applied for realizing the process 40.

In one example, the EPS optimization may include a Control Plane CIoT EPS optimization, a User Plane CIoT EPS optimization, an attach without PDN connectivity, or a SMS transfer without combined attach (e.g., which is requested).

In one example, the first NAS message may include an "ATTACH ACCEPT" message, an "ATTACH REJECT" message, a "TRACKING AREA UPDATING ACCEPT" message or a "TRACKING AREA UPDATING REJECT" message.

In one example, a first cell where the UE receives the system information and a second cell where the UE receives the first NAS message may be different. That is, the UE may move across different cells (e.g., from the first cell to the second cell) in the same TA, and may receive the system information and the NAS message indifferent cells.

In one example, the UE may determine to use the EPS optimization by transmitting a second NAS message (e.g., NAS PDU) or an AS message related to the EPS optimization, e.g., to the network. In one example, the UE may determine not to use the EPS optimization by not transmitting a second NAS message (e.g., NAS PDU) or an AS message related to the EPS optimization, e.g., to the network.

An example is used for illustrating the process 40 as follows. A UE supporting a Control Plane CIoT EPS optimization may receive system information, and may determine whether a network supports the Control Plane CIoT EPS optimization according to the system information. Then, the UE may transmit an "ATTACH REQUEST" message including information (e.g., an information element) indicating that the UE will use the Control plane CIoT EPS optimization to the network, when the system information indicates that the network supports the Control Plane CIoT EPS optimization. The UE may receive an "ATTACH ACCEPT" message including information indicating that the network does not support the Control Plane CIoT EPS optimization. The UE may ignore the information about a support of the Control Plane CIoT EPS optimization provided in the "ATTACH ACCEPT" message, and may follow information about a support of the Control Plane CIoT EPS optimization provided in the system information. Accordingly, the UE may transmit user data encapsulated in a NAS message (e.g., NAS PDU) to the network. The UE may reselect another cell of the same TA due to a cell reselection procedure, and another system information in the other cell may indicate that the Control Plane CIoT EPS optimization is supported. Accordingly, the UE may transmit the user data encapsulated in another NAS message (e.g., NAS PDU).

Another example is used for illustrating the process 40 as follows. A UE attached to a network to use a Control Plane CIoT EPS optimization may select a cell belonging to a TA, and may receive system information indicating that the network supports the Control Plane CIoT EPS optimization. Then, the UE may transmit a "TRACKING AREA UPDATE REQAUEST" message to the network for requesting to use the Control Plane CIoT EPS optimization. In response to the transmission of the "TRACKING AREA UPDATE REQAUEST" message, the UE may receive a "TRACKING AREA UDATING ACCEPT" message including information (e.g., an information element) indicating that the network does not support the Control Plane CIoT EPS optimization. Then, the UE may ignore the information about a support of the Control Plane CIoT EPS optimization provided in the "TRACKING AREA UDATING ACCEPT" message and may transmit user data encapsulated in a NAS message (e.g., NAS PDU) to the network, when the system information indicates that the Control Plane CIoT EPS optimization is supported.

Figure 5:
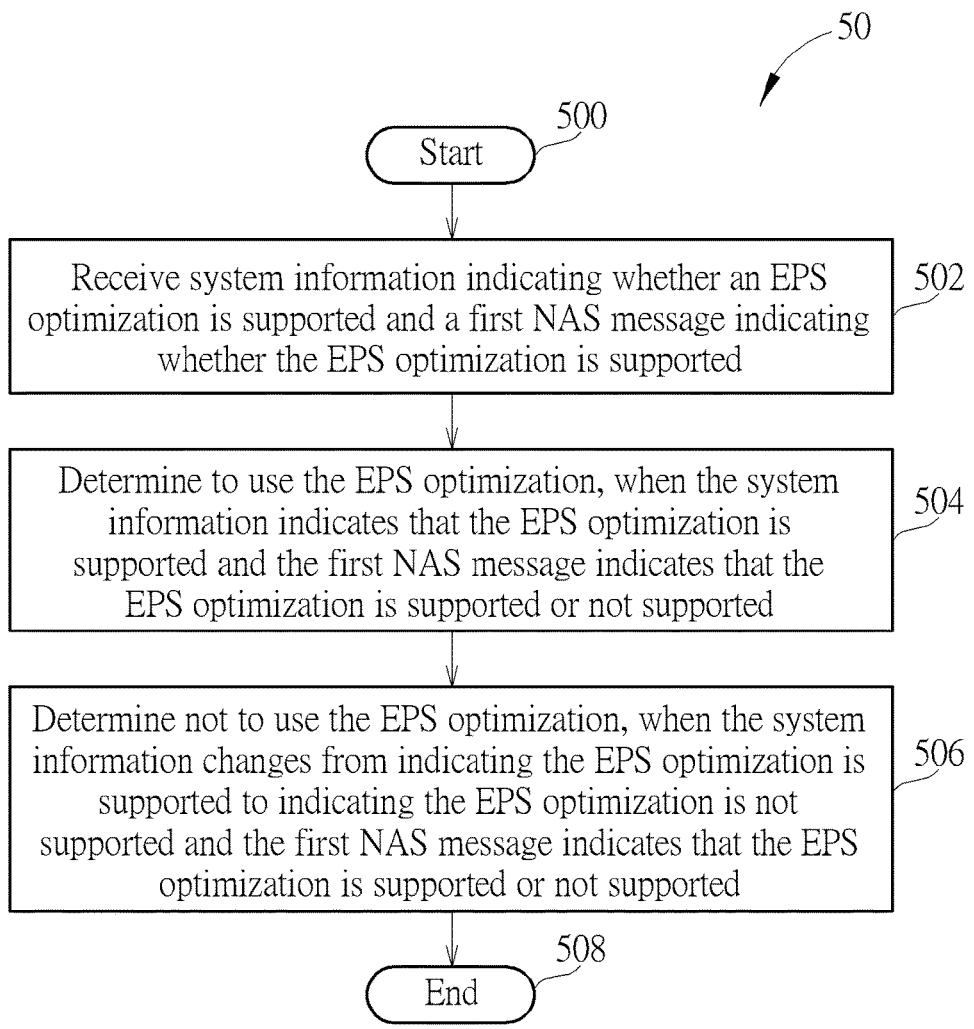
FIG. 5 is a flowchart of a process according to an example of the present invention.

FIG. 5 is a flowchart of a process 50 according to an example of the present invention. The process 50 maybe utilized in a UE (e.g., the communication device in FIG. 1), to handle a network feature in a wireless communication system. The process 50 includes the following steps:

Step 500: Start.

Step 502: Receive system information indicating whether an EPS optimization is supported and a first NAS message indicating whether the EPS optimization is supported.

Step 504: Determine to use the EPS optimization, when the system information indicates that the EPS optimization is supported and the first NAS message indicates that the EPS optimization is supported or not supported.

Step 506: Determine not to use the EPS optimization, when the system information changes from indicating the EPS optimization is supported to indicating the EPS optimization is not supported and the first NAS message indicates that the EPS optimization is supported or not supported.

Step 508: End.

According to the process 50, the UE may receive system information (e.g., broadcasted by a network, e.g., the network in FIG. 1) indicating whether an EPS optimization is supported and a first NAS message indicating whether the EPS optimization is supported. Then, the UE may determine to use the EPS optimization, when the system information indicates that the EPS optimization is supported and the first NAS message indicates that the EPS optimization is supported or not supported. Further, the UE may determine not to use the EPS optimization, when the system information changes from indicating the EPS optimization is supported to indicating the EPS optimization is not supported (e.g., due to maintenance) and the first NAS message indicates that the EPS optimization is supported or not supported. That is, the UE determines whether the EPS optimization is supported by the network according to (e.g., by using) the system information, when information of a support of the EPS optimization provided in the system information and information of a support of the EPS optimization provided in the NAS message are mismatched. In addition, the UE determines whether the EPS optimization is supported by the network according to (e.g., by using) the changed (e.g., updated) system information rather than the system information (i.e., the original system information) , when the system information is changed. In other words, a priority of the changed system information is higher than a priority of the system information, and the priority of the system information is higher than a priority of the NAS message. Thus, the UE is able to determine how to use the EPS optimization properly.

It should be noted that, the UE may not attempt to use (e.g., request or use) the EPS optimization which is not indicated as supported in the system information or the changed system information according to the process 50.

Realization of the process 50 is not limited to the above description. The following examples may be applied for realizing the process 50.

In one example, the EPS optimization may include a Control Plane CIoT EPS optimization, a User Plane CIoT EPS optimization, an attach without PDN connectivity, or a SMS transfer without combined attach (e.g., which is requested).

In one example, the first NAS message may include an "ATTACH ACCEPT" message, an "ATTACH REJECT" message, a "TRACKING AREA UPDATING ACCEPT" message or a "TRACKING AREA UPDATING REJECT" message.

In one example, a first cell where the UE receives the system information and a second cell where the UE receives the first NAS message may be different. That is, the UE may move across different cells (e.g. , from the first cell to the second cell) in the same TA, and may receive the system information and the NAS message in different cells.

In one example, the UE may determine to use the EPS optimization by transmitting a second NAS message (e.g., NAS PDU) or an AS message related to the EPS optimization, e.g., to the network. In one example, the UE may determine not to use the EPS optimization by not transmitting a second NAS message (e.g., NAS PDU) or an AS message related to the EPS optimization, e.g., to the network.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device) , an electronic system, or combination thereof . An example of the means be the communication device 20. Any of the abovementioned processes may be compiled into the program code 214.

To sum up, the present invention provides a method and related communication device for handling a network feature. Accordingly, the UE is able to determine whether the EPS optimization is supported, when information of a support of the EPS optimization provided in the system information and information of a support of the EPS optimization provided in the NAS message are mismatched. Thus, the EPS optimization can be determined how to use properly.

What is claimed is:

1. A communication device of handling a network feature, comprising:
    a storage unit for storing instructions of: receiving system information indicating whether an Evolved Packet System (EPS) optimization is supported and a first Non Access Stratum (NAS) message indicating whether the EPS optimization is supported;
    determining to use the EPS optimization, when the system information indicates that the EPS optimization is not supported and the first NAS message indicates that the EPS optimization is supported; and
    determining not to use the EPS optimization, when the system information indicates that the EPS optimization is supported and the first NAS message indicates that the EPS optimization is not supported; and
    a processing circuit, coupled to the storage unit, configured to execute the instructions stored in the storage unit;
    wherein a first cell where the communication device receives the system information and a second cell where the communication device receives the first NAS message are different.

2. The communication device of claim 1, wherein the EPS optimization comprises a Control Plane Cellular Internet of Thing (CIoT) EPS optimization, a User Plane CIoT EPS optimization, an attach without Packet Data Network (PDN) connectivity, or a Short Message Service (SMS) transfer without combined attach.

3. The communication device of claim 1, wherein the first NAS message comprises an "ATTACH ACCEPT" message, an "ATTACH REJECT" message, a "TRACKING AREA UPDATING ACCEPT" message or a "TRACKING AREA UPDATING REJECT" message.

4. The communication device of claim 1, wherein the instruction of determining to use the EPS optimization comprises:
    transmitting a second NAS message or an access stratum (AS) message related to the EPS optimization.

5. The communication device of claim 1, the instruction of determining not to use the EPS optimization comprises:
    not transmitting a second NAS message or an AS message related to the EPS optimization.

6. A communication device of handling a network feature, comprising:
- a storage unit for storing instructions of:
  - receiving system information indicating whether an Evolved Packet System (EPS) optimization is supported and a first Non Access Stratum (NAS) message indicating whether the EPS optimization is supported;
  - determining to use the EPS optimization, when the system information indicates that the EPS optimization is supported and the first NAS message indicates that the EPS optimization is not supported; and
  - determining not to use the EPS optimization, when the system information indicates that the EPS optimization is not supported and the first NAS message indicates that the EPS optimization is supported; and
- a processing circuit, coupled to the storage unit, configured to execute the instructions stored in the storage unit;
- wherein a first cell where the communication device receives the system information and a second cell where the communication device receives the first NAS message are different.

7. The communication device of claim 6, wherein the EPS optimization comprises a Control Plane Cellular Internet of Thing (CIoT) EPS optimization, a User Plane CIoT EPS optimization, an attach without Packet Data Network (PDN) connectivity, or a Short Message Service (SMS) transfer without combined attach.

8. The communication device of claim 6, wherein the first NAS message comprises an "ATTACH ACCEPT" message, an "ATTACH REJECT" message, a "TRACKING AREA UPDATING ACCEPT" message or a "TRACKING AREA UPDATING REJECT" message.

9. The communication device of claim 6, wherein the instruction of determining to use the EPS optimization comprises:
- transmitting a second NAS message or an access stratum (AS) message related to the EPS optimization.

10. The communication device of claim 6, the instruction of determining not to use the EPS optimization comprises:
- not transmitting a second NAS message or an AS message related to the EPS optimization.

11. A communication device of handling a network feature, comprising:
- a storage unit for storing instructions of:
  - receiving system information indicating whether an Evolved Packet System (EPS) optimization is supported and a first Non Access Stratum (NAS) message indicating whether the EPS optimization is supported;
  - determining to use the EPS optimization, when the system information indicates that the EPS optimization is supported and the first NAS message indicates that the EPS optimization is supported or not supported; and
  - determining not to use the EPS optimization, when the system information changes from indicating the EPS optimization is supported to indicating the EPS optimization is not supported and the first NAS message indicates that the EPS optimization is supported or not supported; and
- a processing circuit, coupled to the storage unit, configured to execute the instructions stored in the storage unit;
- wherein a first cell where the communication device receives the system information and a second cell where the communication device receives the first NAS message are different.

12. The communication device of claim 11, wherein the EPS optimization comprises a Control Plane Cellular Internet of Thing (CIoT) EPS optimization, a User Plane CIoT EPS optimization, an attach without Packet Data Network (PDN) connectivity, or a Short Message Service (SMS) transfer without combined attach.

13. The communication device of claim 11, wherein the first NAS message comprises an "ATTACH ACCEPT" message, an "ATTACH REJECT" message, a "TRACKING AREA UPDATING ACCEPT" message or a "TRACKING AREA UPDATING REJECT" message.

14. The communication device of claim 11, wherein the instruction of determining to use the EPS optimization comprises:
- transmitting a second NAS message or an access stratum (AS) message related to the EPS optimization.

15. The communication device of claim 11, the instruction of determining not to use the EPS optimization comprises:
- not transmitting a second NAS message or an AS message related to the EPS optimization.

* * * * *